(12) United States Patent
Mizuno (10) Patent No.: US 8,576,300 B2
(45) Date of Patent: Nov. 5, 2013

(54) IMAGE CAPTURING APPARATUS AND CONTROL METHOD THEREFOR

(75) Inventor: Takashi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 12/775,864

(22) Filed: May 7, 2010

(65) Prior Publication Data

US 2010/0289920 A1 Nov. 18, 2010

(30) Foreign Application Priority Data

May 14, 2009 (JP) ................................. 2009-118044

(51) Int. Cl.
*H04N 5/76* (2006.01)

(52) U.S. Cl.
USPC .................................. 348/231.3; 348/231.99

(58) Field of Classification Search
USPC ...................................................... 348/231.3
See application file for complete search history.

(56) References Cited

U.S. PATENT DOCUMENTS

| | | | |
|---|---|---|---|
| 7,327,386 B2 * | 2/2008 | Kawade ...................... 348/207.1 |
| 2002/0023010 A1 * | 2/2002 | Rittmaster et al. .............. 705/26 |
| 2004/0135904 A1 * | 7/2004 | Shiota et al. ............. 348/231.99 |
| 2007/0115373 A1 * | 5/2007 | Gallagher et al. .......... 348/231.3 |
| 2009/0007278 A1 | 1/2009 | Yano et al. ....................... 726/27 |
| 2009/0322904 A1 * | 12/2009 | Takahashi .................. 348/231.3 |
| 2011/0043658 A1 * | 2/2011 | Sasai .......................... 348/231.3 |

FOREIGN PATENT DOCUMENTS

| JP | 2003-050703 | 2/2003 |
|---|---|---|
| JP | 2003-198918 | 7/2003 |
| JP | 2004-343627 | 12/2004 |
| JP | 2007-235239 | 9/2007 |
| JP | 2009-009305 | 1/2009 |

* cited by examiner

*Primary Examiner* — Sinh Tran
*Assistant Examiner* — Christopher K Peterson
(74) *Attorney, Agent, or Firm* — Fitzpatrick, Cella, Harper & Scinto (57) ABSTRACT

An image capturing apparatus and a control method therefor provide privacy protection by obtaining the current location of the image capturing apparatus and determining whether or not the current location is within a preset location information addition-inhibited area. If the image capturing apparatus is within a location information addition-inhibited area, the image capturing apparatus and control method therefor do not add location information to captured image data.

14 Claims, 10 Drawing Sheets

DOES NOT ADD LOCATION INFORMATION
TO AN IMAGE CAPTURED WITHIN

A RADIUS OF [ 1000 ] m

FROM CURRENT LOCATION
NORTH LATITUDE 50°45' EAST LONGITUDE 130°12'

COMMENT REGARDING LOCATION [ HOME ]

[ CANCEL ]  [ SET ]

FIG. 5

| LATITUDE | LONGITUDE | RADIUS | COMMENT |
|---|---|---|---|
| NORTH LATITUDE 50° 45' | EAST LONGITUDE 130° 12' | 1000m | HOME |
| NORTH LATITUDE 50° 14' | EAST LONGITUDE 129° 35' | 100m | CHUKYO LAND |
| NORTH LATITUDE 49° 45' | EAST LONGITUDE 132° 48' | 300m | MARUNOUCHI |
| NORTH LATITUDE 48° 28' | EAST LONGITUDE 131° 39' | 125m | |

| 1301 INDIVIDUAL NAME | 501 LATITUDE | 502 LONGITUDE | 503 RADIUS | 504 COMMENT |
|---|---|---|---|---|
| MS. A | NORTH LATITUDE 50° 45' | EAST LONGITUDE 130° 12' | 1000m | HOME |
| MS. A | NORTH LATITUDE 50° 14' | EAST LONGITUDE 129° 35' | 100m | CHUKYO LAND |
| MS. A | NORTH LATITUDE 49° 45' | EAST LONGITUDE 132° 48' | 300m | MARUNOUCHI |
| MS. A | NORTH LATITUDE 48° 28' | EAST LONGITUDE 131° 39' | 125m | |
| MR. B | NORTH LATITUDE 50° 45' | EAST LONGITUDE 130° 12' | 1000m | HOME |
| MR. B | NORTH LATITUDE 50° 00' | EAST LONGITUDE 130° 00' | 150m | CHUKYO-TO ELEMENTARY SCHOOL |

IMAGE CAPTURING APPARATUS AND CONTROL METHOD THEREFOR

BACKGROUND OF THE INVENTION

1. Field of the Invention

The present invention relates to an image capturing apparatus and a control method therefor, and more particularly, to an image capturing apparatus having the capability to add location information to a captured image, and a control method for the image capturing apparatus.

2. Description of the Related Art

In recent years, a growing number of electronic devices have the ability to add location information to a captured image. For example, camera phones and digital cameras that have a built-in global positioning system (GPS) can add location information to a captured image during image capture. In addition, using a device that records time and location information at predetermined intervals (a GPS logger) it is also possible to add location information to a captured image by correlating the image capture time of the captured image and the time recorded by the GPS logger.

At present, when it is common to put images that individuals have captured on their blogs or home pages, publicizing images to which location information has been added poses problems of privacy. For example, not only does information such as where the photographer was and when become available, but if, for example, the image is one that was captured at the home of an acquaintance, it is also possible to identify the location of that acquaintance's home.

Conventionally, in terms of privacy protection, there is an image capturing apparatus that enables the range of people who can access a captured image during image capture to be set (for example, only the photographer, family, friends, etc.) and the range of publication restricted (Japanese Patent Laid-Open No. 2007-235239). In addition, a digital camera that deletes additional information of a captured image when the captured image is transmitted over a communication network is disclosed in Japanese Patent Laid-Open No. 2004-343627.

The configuration of the invention disclosed in Japanese Patent Laid-Open No. 2007-235239 is one that sets the people who can access the image, and requires that a decision be made in advance for each person as to which sort of access level they should belong. Then, the level of publication for controlling whether to publicize or not must be decided for each image. In this case, it is necessary to perform each and every one of these operations, thus complicating the setting operation. In addition, the configuration described above is one that restricts the people who have access and deletes additional information including location information during transmission of the image, which means that the location information remains recorded on the original captured image. This means that if, for example, the captured image is leaked through a third party to whom access is permitted, or the original captured image is accidentally publicized by mistake, the location information cannot be prevented from being known by the general public.

At the same time, if publication is to be permitted based on the location, for example, the locations of one's friends' homes or one's own home are not to be known, then it becomes necessary to capture images while remaining aware of which locations are permitted to be publicized and which are not, which complicates the setting operation at each and every image capture.

SUMMARY OF THE INVENTION

The present invention has been made in view of the problems of the conventional art described above, and provides an image capturing apparatus that can provide privacy protection with a simple and easy setting, and a control method for the image capturing apparatus.

According to an aspect of the present invention, there is provided an image capturing apparatus comprising: a first acquisition unit that obtains a current location of the image capturing apparatus; a first storage unit that stores information that specifies an inhibited area within which an addition of location information representing the current location of the image capturing apparatus is inhibited; a determination unit that determines whether or not the current location of the image capturing apparatus obtained by the first acquisition unit is within the inhibited area stored in the first storage unit; and a generating unit that generates captured image data in response to input of a capturing instruction, wherein the generating unit generates captured image data to which the location information is not added in a case in which it is determined by the determination unit that the current location of the capturing instruction is within the inhibited area, and generates captured image data to which the location information is added in a case in which it is determined by the determination unit that the current location of the capturing instruction is not within the inhibited area.

According to another aspect of the present invention, there is provided a control method for an image capturing apparatus having an acquisition unit that obtains the current location of the image capturing apparatus, the method comprising: a determining step of determining whether or not the current location of the image capturing apparatus obtained by the acquisition unit is within an inhibited area stored in a storage unit; and a generating step of generating captured image data in response to input of a capturing instruction, wherein the generating step generates captured image data to which location information representing the current location of the image capturing apparatus is not added in a case in which it is determined in the determining step that the current location of the capturing instruction is within the inhibited area, and generates captured image data to which the location information is added in a case in which it is determined in the determining step that the current location of the capturing instruction is not within the inhibited area.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
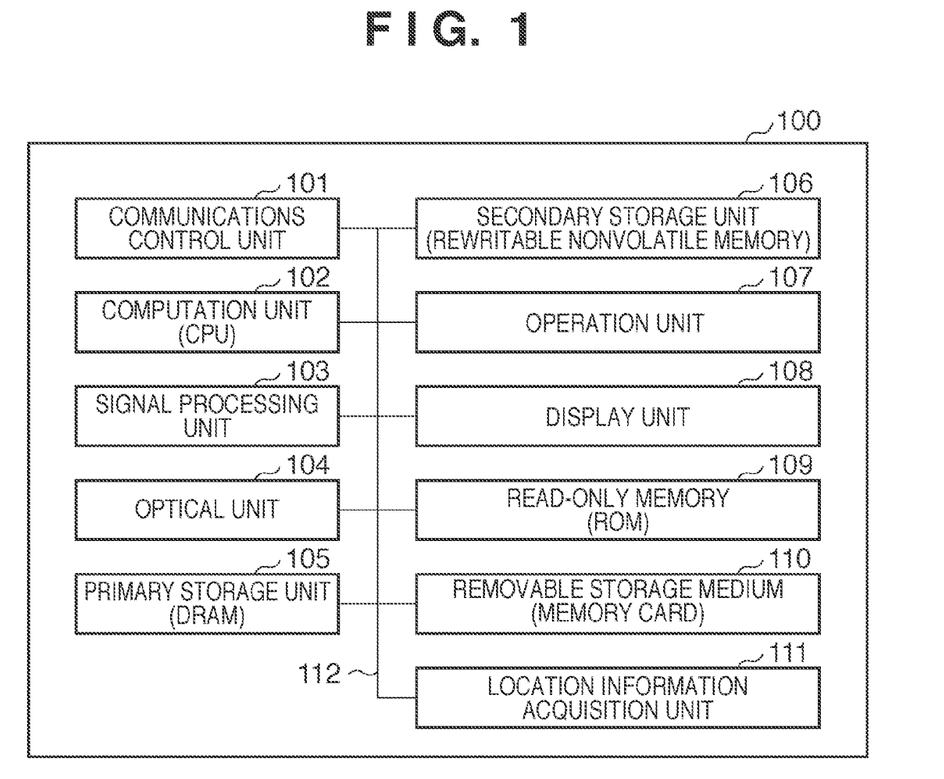
FIG. 1 is a block diagram showing a configuration example of an image capturing apparatus 100 according to a first embodiment of the present invention.

In an image capturing apparatus 100 according to a first embodiment of the present invention shown in FIG. 1, a communications control unit 101 controls wired or wireless communication with an information processing apparatus, not shown. A computation unit (CPU) 102 executes programs stored in a read-only memory (ROM) 109 and controls all parts of the image capturing apparatus 100, thereby controlling operation of the image capturing apparatus 100.

A signal processing unit 103 carries out signal processing on a captured image, including color interpolation and white balance adjustment, edge enhancement, noise reduction, compression encoding and decoding, and the like.

An optical unit 104 is equipped with an image sensor, a lens, an aperture, a mechanical shutter, an aperture/shutter drive mechanism, and the like. In addition, in a case in which the lens has an autofocus mechanism and a zoom mechanism, the optical unit 104 also has a focus adjustment motor and a zoom drive motor.

A primary storage unit (DRAM) 105 is used as a temporary storage area for the CPU 102.

A secondary storage unit 106 is a rewritable nonvolatile memory such as a flash memory (registered trademark), and stores parameters and various settings and the like used by the CPU 102.

An operation unit 107 contains a shutter button, a power button, direction keys, a set/execute button, menu keys, and the like. Through the operation unit 107, a user inputs various settings and instructions to the image capturing apparatus 100.

A display unit 108 displays a captured image or a graphical user interface (GUI). The display unit 108 may be a liquid crystal display, an organic EL display, or the like.

A read-only memory (ROM) 109 stores programs that the CPU 102 executes.

A removable storage medium 110 (hereinafter simply "storage medium 110") may be a semiconductor memory card, and stores captured image data, audio data, and the like. The storage medium 110 is accessibly attached via an interface such as a card slot, not shown, with which the image capturing apparatus 100 is equipped.

A location information acquisition unit 111 may be a GPS receiver, which, based on information received from a GPS satellite, computes the current location of the image capturing apparatus 100 and generates location information that represents the current location. It is to be noted that the location information acquisition unit 111 may be externally connected to the image capturing apparatus 100.

A CPU bus 112 includes an address bus, a data bus, and a control bus, and connects all internal parts of the image capturing apparatus 100.

In the present embodiment, although the captured image file may be any format in which location information can be recorded as additional information, here the captured image file is a JPEG-compressed data file that conforms to the Exif standard. Exif-specific additional information containing GPS information is recordable as header information in the JPEG-compressed data file.

Figure 2:
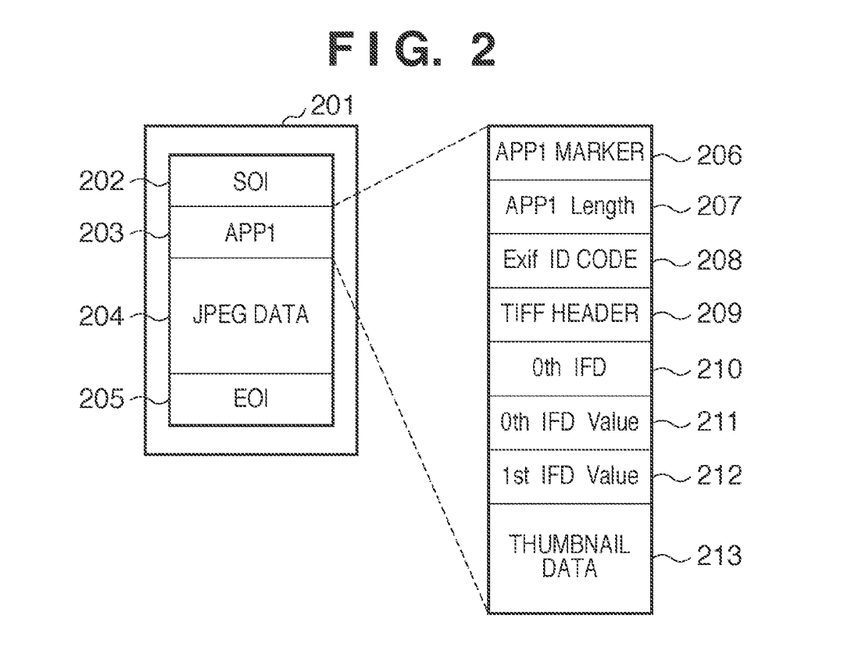
FIG. 2 is a schematic diagram showing the structure of a JPEG-compressed data file having Exif additional information.

In FIG. 2, a JPEG-compressed data file 201 having Exif additional information starts with an area 202 that records data indicating the head of the file (SOI marker). An application/marker segment (APP1) 203 is an area that records data that shows the Exif additional information. In a JPEG data area 204, parameters necessary for decoding as well as the encoded image data are recorded. Lastly, there is provided an area 205 that records data indicating the end of the JPEG-compressed data file (EOI marker).

A more detailed description is now given of the contents of the application/marker segment (203).

In an area designated by reference numeral 206, data indicating the head of the application/marker segment 203 (APP1 marker) is recorded. The APP1 marker is a hexadecimal number "FFE1".

In an area designated by reference numeral 207, the size of the application/marker segment 203 is recorded.

Reference numeral 208 designates an area that records an Exif ID code.

Reference numeral 209 designates an area that records a TIFF header, in which is recorded an offset where the first image file directory (IFD) data is contained.

Reference numerals 210 and 211 designate areas that contain image data attribute information. Attribute information is information such as image data configuration, image recording location, image data characteristics, information about the image capturing apparatus, and the like. Area 211 is an area that records values for some attribute information for which values cannot be recorded in 210. Image location information is also contained in this area.

Reference numeral 212 designates an area that records thumbnail attribute information.

Reference numeral 213 is an area that records thumbnail data.

Figure 3:
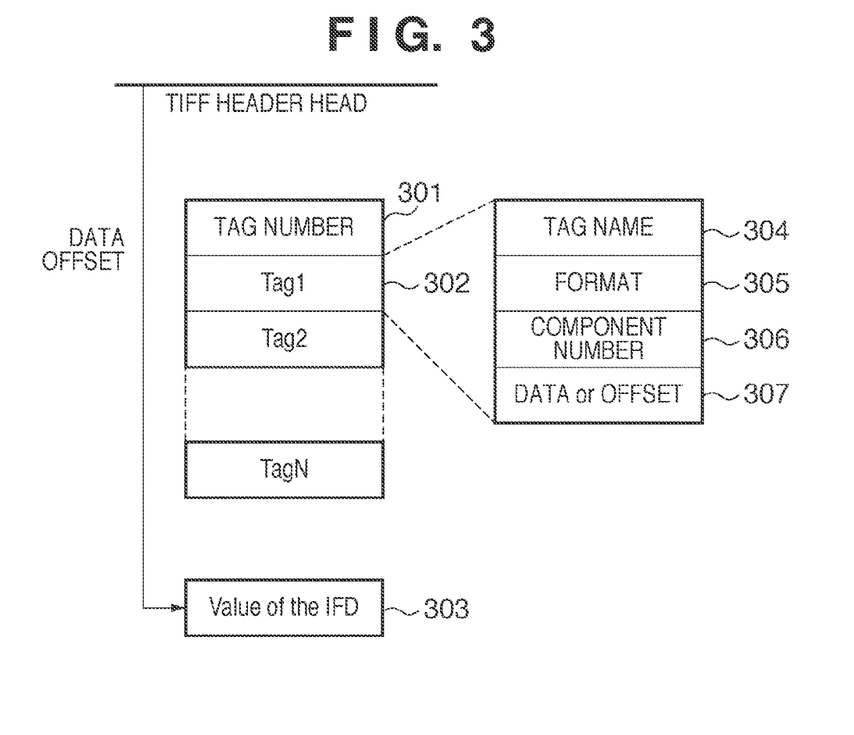
FIG. 3 is a diagram showing the structure of an image file directory (IFD)

FIG. 3 is a diagram showing the structure of an IFD.

Reference numeral 301 designates an area that records the tag number. A tag is a unit that describes an attribute information parameter. The IFD data has a tag number equal to the number of parameters. In a case in which the tag number N=10, "10" is written in area 301.

Reference numeral 302 designates a tag. Each tag 302 is composed of a tag name 304, a format 305, a component number 306, and data or offset 307. The tag name is recorded in the tag name 304. The tag name is a number that shows an item of attribute information. In the format 305 is recorded data indicating the attribute information data format. The attribute information data format includes 1-byte data, 2-byte data, character string, fraction, and the like. In the component number 306 is recorded a number (a component number) indicating how many pieces of data there are in that tag for the data format specified in the format 305. For example, if the character string format has been specified in the format 305 and the component number 306 is 20, then this attribute information is 20-character character string data. Similarly, if 2-byte data is specified in the format 305 and the component number 306 is "2", this indicates that this attribute information is 2 pieces of 2-byte data.

The data or offset 307 records data indicating either the attribute information itself or the offset from the head of the TIFF header 209. The data or offset 307 is a 4-byte, fixed length area. Accordingly, in the event that the data amount exceeds 4 bytes, it records the offset from the head of the TIFF header 209 to the address at which the actual data is recorded, and records the value of the attribute information from the address indicated by the offset (area 303).

A description is now given of recording location information to a JPEG-compressed data file. Here, the location information to be recorded is, for example, north latitude 50°13' and east longitude 140°48'. This location information is recorded in IFD (GPS IFD) format in the JPEG-compressed data file, specifically in the tag 302.

In this case, the hexadecimal number "8825" indicating location information is recorded in the tag name 304. In the format 305, "4" is recorded as the format of the data. In the data or offset 307 is recorded the offset from the head of the TIFF header 206. The actual location information is recorded from an address that is separated from the head of the TIFF header 206 by the number of bytes recorded in the data or offset 307, in a format called GPS IFD.

The GPS IFD also has the configuration shown in FIG. 3, and in the tag number 301 is recorded the number of tags needed for the location information. In this example, five tags are needed: for the GPS tag version, for information indicating whether north latitude or south latitude, latitude, for information indicating whether east longitude or west longitude and longitude. Therefore, "5" is recorded in the tag number 301. In the tag 302 is recorded the GPS tag version. At this time, information indicating the GPS tag version is recorded in the tag name 304, the format 305, the component number 306, and the data or offset 307.

Similarly, in the next tag (Tag 2) is recorded an information tag indicating north latitude or south latitude, a latitude tag in Tag 3, an information tag indicating east or west longitude in Tag 4, and finally, a longitude tag in Tag 5. Latitude and longitude are recorded in a 4-byte/4-byte fraction format, such that 50°13' is recorded as "3013" and "60", and 140°48' is recorded as "8448" and "60".

With the image capturing apparatus 100 of the present embodiment, the user can set a geographical area (inhibited area) in which location information is not to be added to the captured image data.

Figure 4:
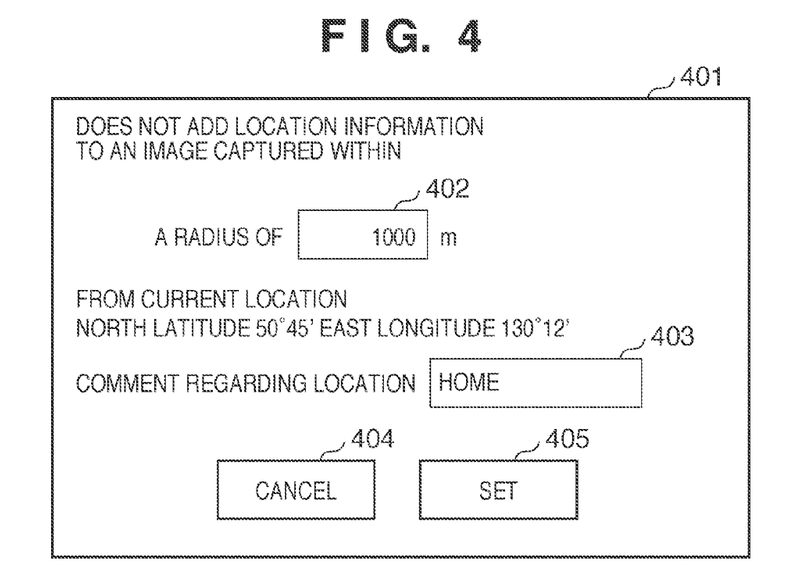
FIG. 4 is a diagram showing an example of a setting screen for setting a location information addition-inhibited area in the image capturing apparatus according to the first embodiment of the present invention.

An example of a setting screen is shown in FIG. 4. A setting screen 401 is generated by the CPU 102 from the current location information obtained from the location information acquisition unit 111 and from GUI data stored in the ROM 109 when the setting screen is called up from the operation unit 107, and is displayed on the display unit 108.

In the setting screen 401, the current location of the image capturing apparatus 100 acquired by the location information acquisition unit 111 is displayed as latitude and longitude. Using the operation unit 107, the user can set a geographical area in which location information is not added from the setting screen 401. In the example shown in FIG. 4, the user can set a circular area centered on the current location by inputting a radius in a field 402. It is to be noted that, as is described later, the shape of the geographical area and the method by which it is specified may be achieved by other methods. For example, matters may be configured so that, by inputting the distance of a diagonal line, a square area centered on the current location is specified. In addition, matters may be configured so that, by inputting a distance in each of an east-west direction and a north-south direction, a rectangular area is specified.

In a comment field 403, a comment concerning the set area can be input. Although it is not necessary to input a comment, doing so enables individual areas to be distinguished in a case in which a plurality of inhibited areas have been set. When the user presses a set button 405 in the setting screen 401, the CPU 102 associates the values inputted in the setting screen 401 at that time (the radius, of the comment(s) at least the radius) and the current location and records them in the secondary storage unit 106. By contrast, in a case in which a cancel button 404 has been pressed, the CPU 102 erases the setting screen 401 and displays the immediately preceding menu screen or the like on the display unit 108. In this case, the CPU 102 does not store anything in the secondary storage unit 106. It is to be noted that, in actuality, the CPU 102 detects the pressing of the set button 405 or the cancel button 404 in the setting screen 401 as the pressing of the buttons that are associated with the set button 405 and the cancel button 404 in the operation unit 107.

Figure 5:
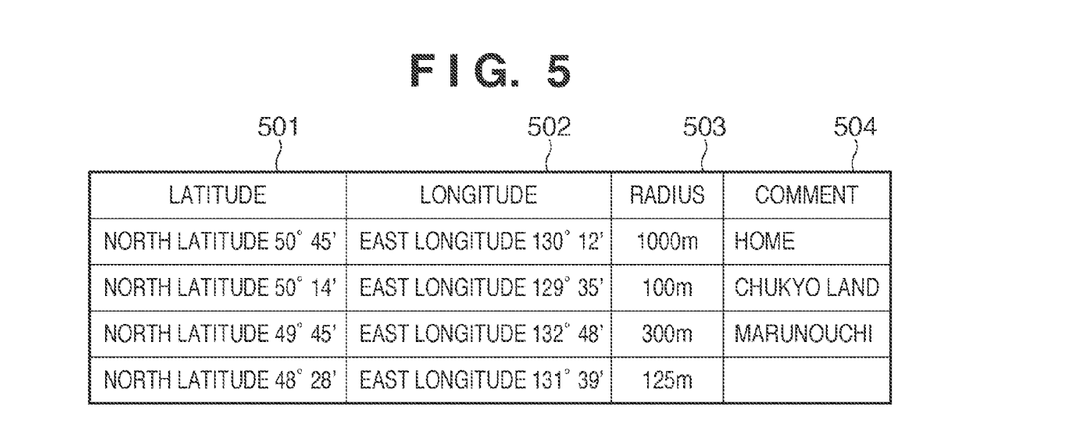
FIG. 5 is a diagram showing an example of a table, stored in the image capturing apparatus according to the first embodiment of the present invention, of ranges in which location information is not added to the image.

In the present embodiment, the inhibited area is stored in the secondary storage unit 106 in the form of a table like that shown in FIG. 5, for example. In the table, information indicating a reference location for the inhibited area (in the present embodiment, the latitude 501 and the longitude 502 of the current location at the time of setting), information indicating a range from the reference location (the radius 503), and the comments 504 are associated with each other. As described above, in general the comments 504 are explanations regarding the locations indicated by the latitude 501 and the longitude 502, and include locations, facility names, geographical names, and the like. However, the contents of the comments 504 may be anything. In addition, comments 504 are not required, and may be left as a blank column like the fourth piece of data shown in FIG. 5.

(Image Capturing Process)

Figure 6:
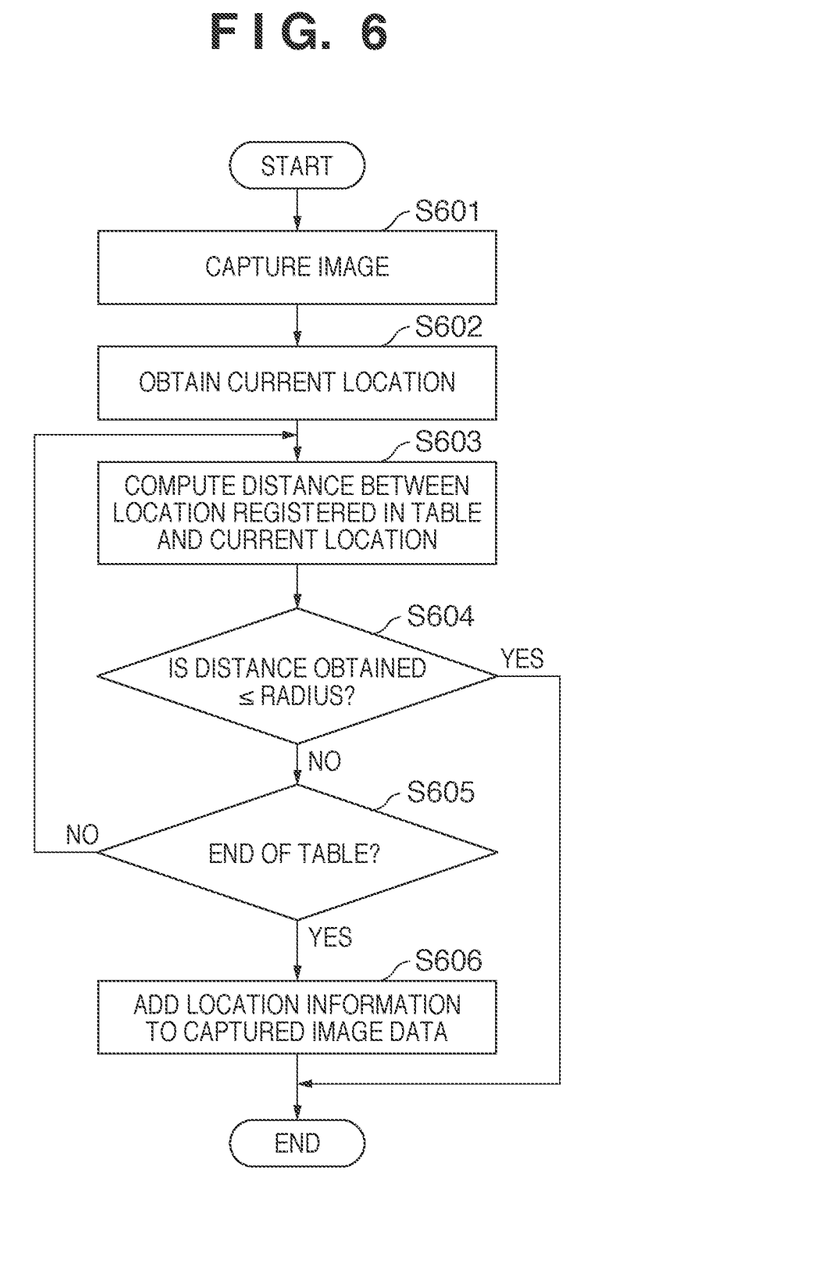
FIG. 6 is a flowchart illustrating an image capturing operation in the image capturing apparatus according to the first embodiment of the present invention.

Next, using the flowchart shown in FIG. 6, a description is given of an image capturing operation in the image capturing apparatus 100 of the present embodiment. The image capturing operation is executed in response to the CPU 102 detecting that a capturing instruction has been input by the shutter button included in the operation unit 107 being pressed or the like. It is assumed that, prior to the capturing instruction being input, for example, in response to detection of a half stroke of the shutter button, the CPU 102 controls the optical unit 104 and carries out automatic exposure control and automatic focus detection control by known methods.

In step S601, the CPU 102 executes an image capturing process. More specifically, the CPU 102, depending on the results of the automatic exposure control and the automatic focus detection control, controls the optical unit 104 aperture, shutter, and the like, and exposes the image sensor. Then, the CPU 102 causes the signal processing unit 103 to carry out so-called development and compression encoding processing on the image signals read out from the image sensor, generate a JPEG-compressed data file that conforms to the Exif standard, and store the file in the primary storage unit 105. This sequence of processing operations is the same as in the conventional image capturing process, and a detailed description thereof is omitted here.

In step S602, the CPU 102 obtains location information from the location information acquisition unit 111. The location information acquisition unit 111, for example, computes the current location at set intervals, and outputs the nearest location information in response to a request from the CPU 102. It is to be noted that, alternatively, the CPU 102 may obtain the current location prior to the image capturing process.

In step S603, the CPU 102 computes the distance between the reference location contained in the inhibited area data previously recorded in the secondary storage unit 106 and the current location obtained in step S602.

For example, if the reference location (point A) is 50°45' north latitude and 130°12' east longitude, and the current location (point B) is 50°34' north latitude and 129°58' east longitude, and if the difference in the latitudinal direction is $\Delta ny$ and the difference in the longitudinal direction is $\Delta nx$, then $$\Delta ny=11'=0.183°$$

$$\Delta nx=14'=0.233°$$

Assuming that the earth is a sphere of radius R (=6378 km), and the difference in distance between two points on the surface of that sphere in the latitudinal direction is $\Delta y$ and in the longitudinal direction is $\Delta x$, then $\Delta y$ and $\Delta x$ can be obtained by the following equations:

$$\Delta y=0.183°/360°\times 2\pi R=20.37 \text{ km}$$

$$\Delta x=0.233°/360°\times 2\pi R=25.94 \text{ km}$$

Then, if the distance between the two points A and B is $\Delta d$, then $\Delta d$ can be obtained by the following equation:

$$\Delta d=\sqrt{(\Delta x^2+\Delta y^2)}=32.98 \text{ km}$$

In step S604, the CPU 102 compares the distance $\Delta d$ obtained in step S603 and the radius registered in the table, and determines if the distance $\Delta d$ is equal to or smaller than the registered radius.

In a case in which it is determined in step S604 that the distance $\Delta d$ is equal to or smaller than the registered radius, then because the image capturing apparatus 100 is within an inhibited area the CPU 102 records the JPEG-compressed data file generated in step S601 in the storage medium 110 without adding location information to the JPEG-compressed data file. It is to be noted that, in a case in which the CPU 102 does not add location information, a comment explaining the location may be added instead of the location information. This added comment may be, of the data in the table, that which is registered in the comment field 403 of that which specifies the area that includes the current location of the image capturing apparatus 100.

In a case in which it is determined in step S604 that the distance $\Delta d$ is larger than the registered radius, in step S605 the CPU 102 determines whether or not a determination as to whether or not the image capturing apparatus 100 is within a specified area has been carried out for all of the data registered in the table. If no data for which such determination has not been carried out remains, then in step S606 the CPU 102 adds location information to the JPEG-compressed data file generated in step S601 and records the file to the storage medium 110. On the other hand, if data for which such determination has not been carried out does remain, then the CPU 102 returns the process to step S603 and continues the determination.

It is to be noted that, here, the description assumes that the image data file (JPEG-compressed data file) generated in step S601 is not immediately recorded to the storage medium 110. However, in a case in which the generated image data file is immediately recorded to the storage medium 110 and processing from step S603 is carried out and location information added, then matters may be configured so that the location information is added to the image data file on the storage medium 110.

(Variation)

The user may be informed in advance that location information will not be added. More specifically, the image capturing apparatus 100 may operate in an image capture mode and obtain current location information in a standby state in which the image capturing apparatus 100 is waiting for a capturing start instruction, and in a case in which the image capturing apparatus 100 is within an inhibited area may inform the user of that fact by message display or the like.

With the typical image capturing apparatus, capturing images continuously and sequentially displaying the captured image while in a standby state in the image capture mode causes the display unit 108 to function as an electronic viewfinder (EVF). Therefore, a message can be superimposed on the EVF image displayed on the display unit 108 (also called a live-view image or a through-display image). Of course, it is also possible to inform the user by audio, and the user may be informed by such methods as the flashing of an LED or other such lamp.

Figure 7:
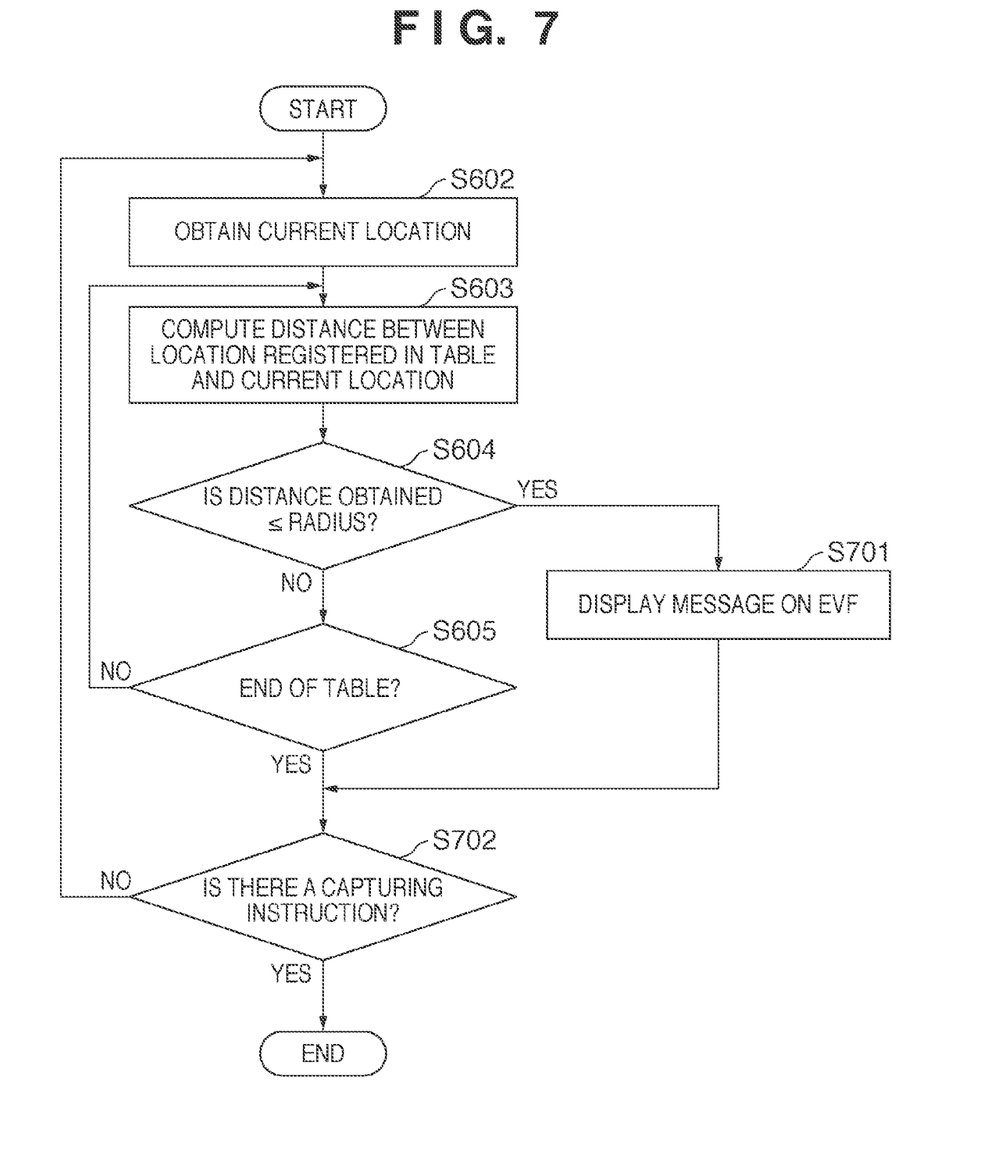
FIG. 7 is a flowchart illustrating operation in an image capture standby state in the image capturing apparatus according to the first embodiment of the present invention.

If a message is to be superimposed on the EVF image, then as shown, for example, in the flowchart shown in FIG. 7, the CPU 102 executes the processes of steps S602 to S605 described above in the standby state. Then, in a case in which it is determined in step S604 that the image capturing apparatus 100 is in an inhibited area, the CPU 102 superimposes a message on the EVF image (step S701). Data for displaying the message can be stored in advance in the ROM 109, for example, similar to the GUI data.

Figure 8:
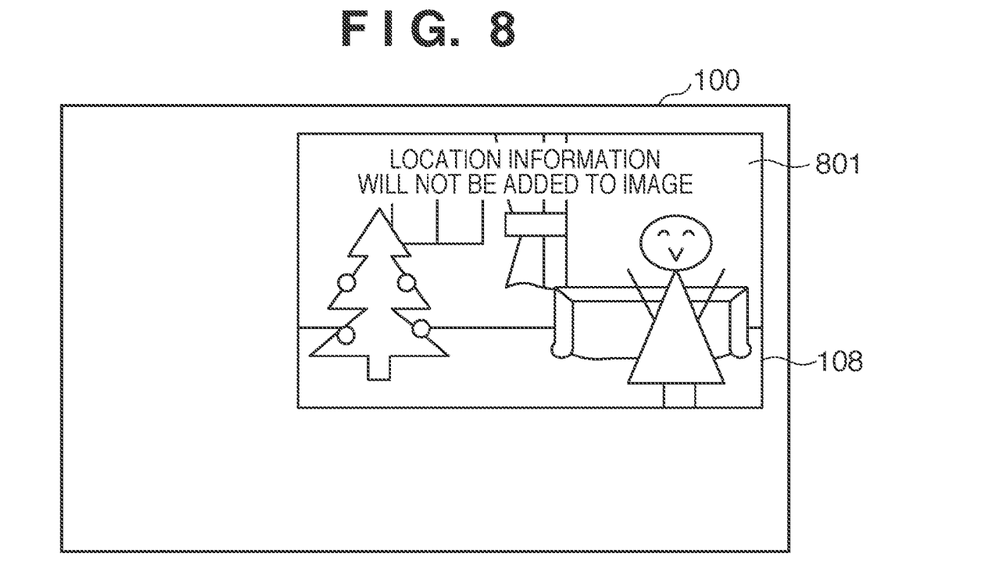
FIG. 8 is a diagram showing an example of a message displayed in step S701 shown in FIG. 7.

FIG. 8 is a diagram showing an example of a message 801 superimposed in step S701. In this manner, when the image capturing apparatus 100 enters an inhibited area, the CPU 102 superimposes the message 801 on the EVF image displayed on the display unit 108. When the user sees this message, he or she can know that location information will not be added to the captured image.

If a capturing instruction is input in the standby state (YES in step S702), the CPU 102 terminates the standby state and starts the image capturing process described with reference to FIG. 6. It is to be noted that, in this case, in the image capturing process, matters may be configured so that, using the determination results obtained in the standby state, the CPU 102 does not once again determine whether or not the current location of the image capturing apparatus 100 is within an inhibited area. That is, once the image capturing process has been carried out in step S601, captured image data can be recorded to the removable storage medium 110 with or without the location information added depending on the determination results obtained in the standby state. If no input of capturing instruction is detected (NO in step S702), the CPU 102 repeats the process from step S602.

Thus, as described above, with the present embodiment it is possible to set with ease an area in which location information is added to the captured image, and moreover, once the setting is carried out the user can reliably prevent the addition of location information depending on the location of the image capturing apparatus without having to being conscious of location. As a result, the present embodiment can provide better privacy protection with a simple and easy setting.

Second Embodiment

In the first embodiment, a description was given of the inhibited area set as a circular area centered on the current location by specifying a radius. In a second embodiment of the present invention, a rectangular area is set by specifying, with respect to the current location, a distance in an east-west direction and a distance in a north-south direction.

Figure 9:
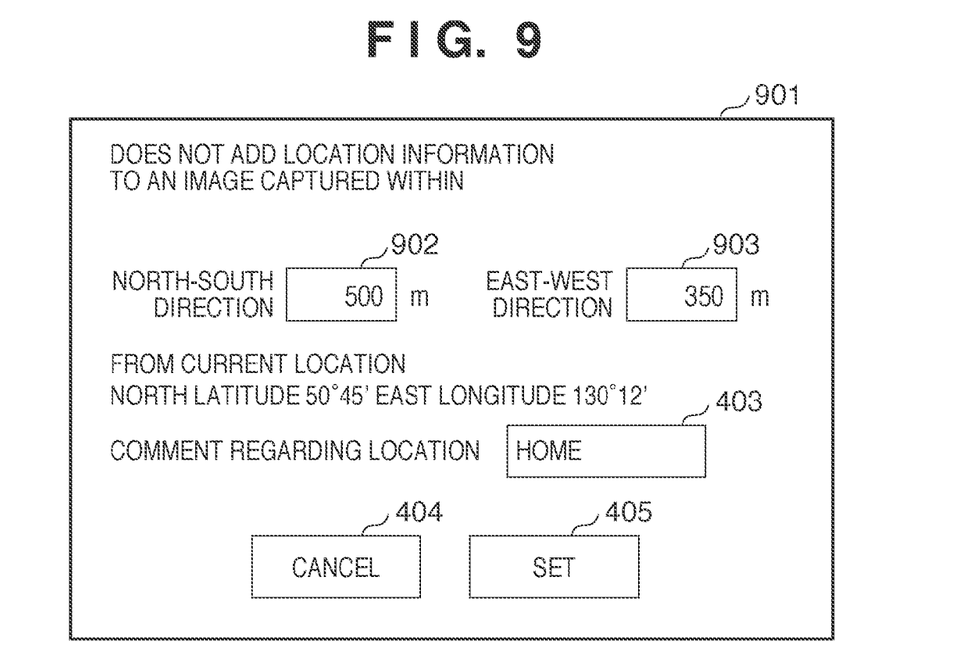
FIG. 9 is a diagram showing an example of a setting screen for setting a location information addition-inhibited area in the image capturing apparatus according to a second embodiment of the present invention.

An example of an inhibited area setting screen 901 in the present embodiment is shown in FIG. 9. In the setting screen 901, the current location of the image capturing apparatus 100 obtained by the location information acquisition unit 111 is displayed as latitude and longitude. Using the operation unit 107, from the setting screen 901 the user can set a geographical area in which location information is not added to the captured image.

The setting screen 901 has fields 902 and 903 for inputting a distance ry(m) in the north-south direction and a distance rx(m) in the east-west direction, but is otherwise the same as the setting screen 401 shown in FIG. 4. The distances in the east-west direction and the north-south direction specified here set the area as distances in each of these directions using the current location as the point of origin.

Figure 10:
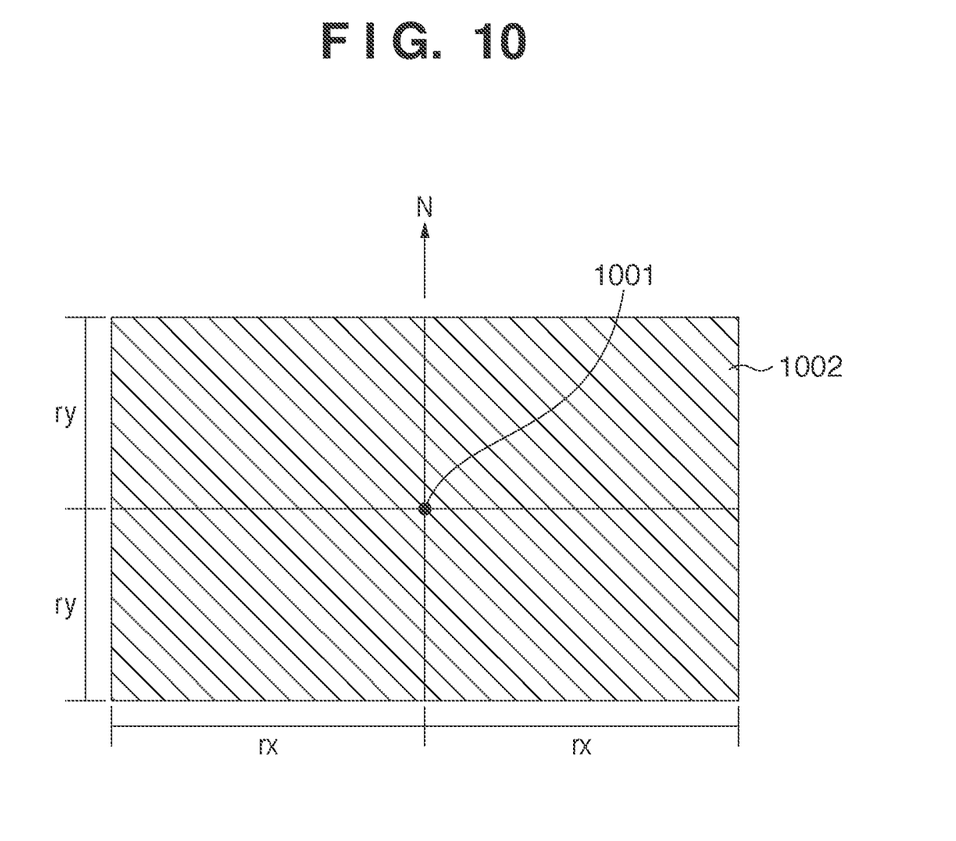
FIG. 10 is a diagram illustrating a location information addition-inhibited area set by values specified in the setting screen shown in FIG. 9.

The relation between the distances specified in fields 902, 903 and the specified area is shown in FIG. 10. In FIG. 10, north is up. A rectangular area 1002 consisting of distances in each of the east direction and the west direction rx(m) and distances in each of the south direction and the north direction ry(m) centered on the current location 1001 is specified as an inhibited area. In the present embodiment, instead of the radius 503 in the table shown in FIG. 5, the distance in the north-south direction ry and the distances in the east-west direction rx are stored.

In addition, if the differences in distances between the current location and the reference location in the latitudinal direction Δy and in the longitudinal direction Δx described above are such that |Δy|≤ry and |Δy|≤rx, then it can be determined that the image capturing apparatus 100 is in an inhibited area.

The present embodiment can also achieve the same effect as that of the first embodiment.

Third Embodiment

In the first and second embodiments, an area centered on the current location of the image capturing apparatus 100 was set as the inhibited area. In a third embodiment of the present invention, any inhibited area can be set by obtaining the data that specifies the inhibited area from another apparatus.

More specifically, the image capturing apparatus 100 obtains data that specifies the inhibited area through the communications control unit 101 or the removable storage medium 110 and registers the data in the secondary storage unit 106.

The format of the data that specifies the inhibited area may be that which specifies a circular area centered on a reference location as in the first embodiment, a rectangular area centered on a reference location as in the second embodiment, or a combination of the two. The reference location may be a separate location from the current location of the image capturing apparatus 100.

The data that specifies this sort of inhibited area may be created by any method. For example, the user can easily obtain the latitude and longitude of the location specified as the reference location at the information processing apparatus using a known map application. Therefore, the data can be generated by displaying a setting screen like the setting screens 401 or 901 described above to the user, allowing the user to input a radius or distances in the east-west and the north-south directions as well as comments, and adding the latitude and longitude of the reference location obtained from the map application.

The image capturing apparatus 100 may obtain the data that specifies the inhibited area directly from the information processing apparatus through the communications control unit 101. Alternatively, the image capturing apparatus 100 may read in the data written to the removable storage medium 110 at the information processing apparatus.

It is to be noted that the image capturing apparatus 100 is capable of displaying a map on the display unit 108, and provided that the latitude and longitude of any position on the map can be obtained, the image capturing apparatus 100 can set an inhibited area whose reference location is any location.

For example, this sort of embodiment can be implemented in a mobile phone equipped with GPS and a camera. In this case, the CPU 102 displays a map in the setting screens 401 or 901 to enable the user to specify a reference location from the map.

Thus, as described above, with the present embodiment it is possible to set any area as an inhibited area. Accordingly, for example, in a case in which there is a plan to visit a friend's home, the user can set an area having as its reference location the friend's home as an inhibited area in advance, thus preventing the user from forgetting to set the inhibited area later on.

Fourth Embodiment

The first through third embodiments were configured to not add location information to an image captured within an inhibited area without exception. By contrast, a fourth embodiment of the present invention permits the addition of location information even to an image captured within an inhibited area provided that a person is not image-captured.

The image capturing apparatus 100 according to the present embodiment is the same as that of the first embodiment, with the exception that the signal processing unit 103 has a face detection function that detects the face of a person from a captured image. Face detection is a technology that is already widely used in image capturing apparatuses, and in the present embodiment as well a known technology can be used, for which reason a detailed description thereof is omitted herein.

Figure 11:
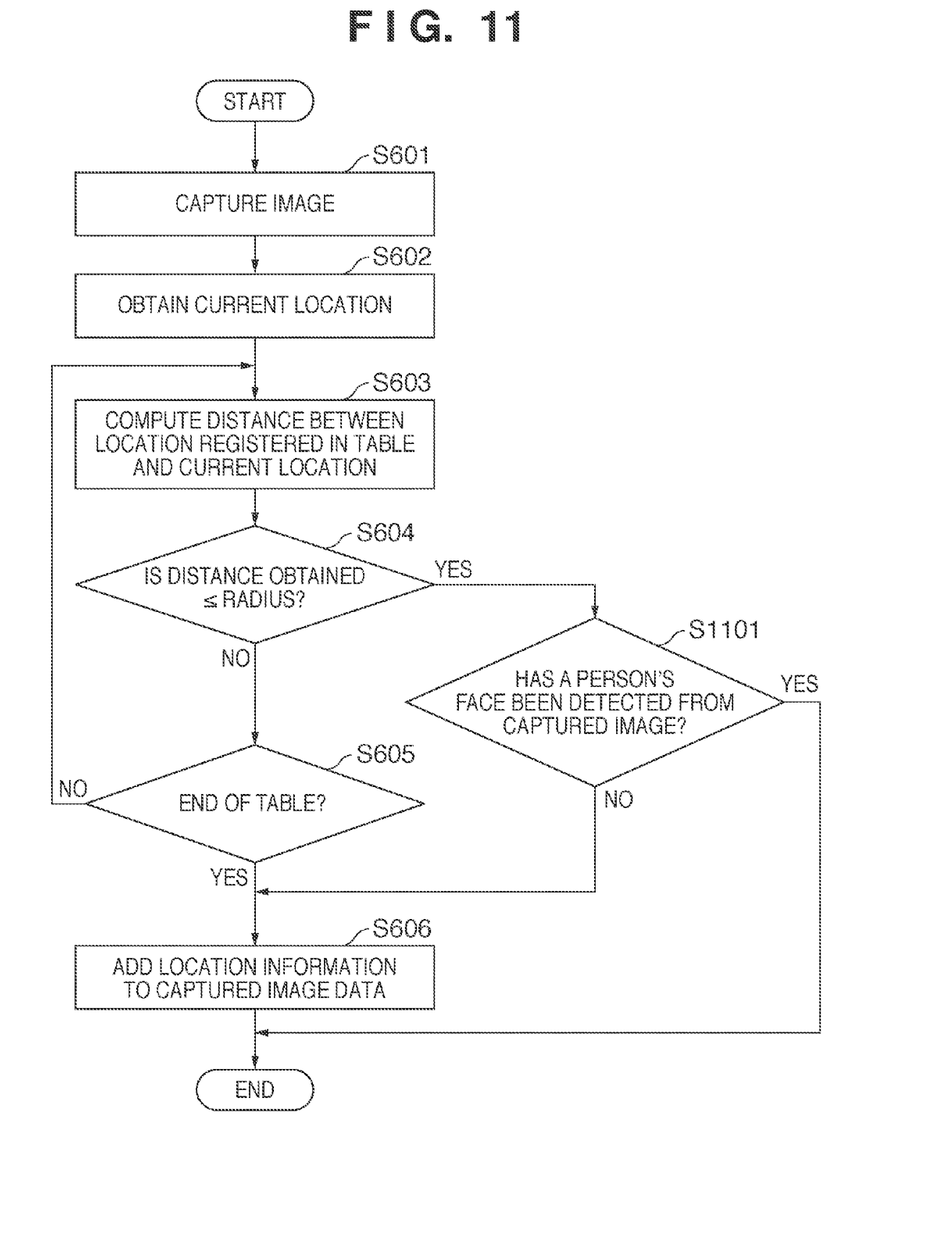
FIG. 11 is a flowchart illustrating an image capturing operation in the image capturing apparatus according to a fourth embodiment of the present invention.

The image capturing process performed by the image capturing apparatus 100 of the present embodiment is now described with reference to the flowchart shown in FIG. 11. In FIG. 11, processes that are the same as those shown in FIG. 6 are given the same reference numerals and description thereof omitted.

In the present embodiment, if it is determined in step S604 that the current location of the image capturing apparatus 100 is within an inhibited area, the CPU 102 obtains from the signal processing unit 103 information indicating whether or not a face is detected in the captured image (step S1101). Then, as per the settings the CPU 102 does not add location information if a face is detected, but does add location information to the captured image if no face is detected.

The user can set this sort of exceptional operation by checking a checkbox such as "permit addition of location information if no face is detected" provided to the inhibited area setting screens 401 or 409. Then, whether or not there is a check may be registered in the table, such that, for data that is checked, the determination described in step S1101 is carried out.

Alternatively, the function that specifies the exceptional operation may be assigned to one of the buttons included in the operation unit 107, and the determination described in step S1101 may be carried out for images captured in a state in which that button is pressed.

It is to be noted that although in the present embodiment whether or not a face is detected is used as the determination criterion for the exception process, alternatively other conditions may be used as the determination criteria. For example, matters may be configured so that location information is added to an image captured in a state in which a particular button of the operation unit 107 is pressed and a particular input is provided during input of a capturing instruction even if the image is captured within the inhibited area.

In addition, as a further variation, a particular person's face information may be registered in the secondary storage unit 106, for example. The signal processing unit 103 uses this registered information to carry out face recognition in addition to face detection, and a determination as to whether or not to add location information may be made using the results of the face recognition.

For example, matters may be configured so that location information is not added to a captured image containing a registered person even outside the inhibited area, whereas location information is added to a captured image not containing the registered person even within the inhibited area.

In this case, publication of location information on the place where the particular registered person went and the danger of an invasion of privacy can be prevented.

In addition, as another variation, conversely to the variation described above, location information may be added to a captured image in which the registered person appears even within the inhibited area, and location information is not added to a captured image in which the registered person does not appear even outside the inhibited area.

Further, for images showing only a registered person, location information may be added even within the inhibited area.

This configuration is useful when, for example, for persons from whom consent has been obtained to publicize images and location information over the internet, images to which location information is added are publicized, whereas for images showing persons from whom consent has not been obtained to publicize location information, there is no publication of location information.

In addition, as a further variation, matters may be arranged so that face information of a particular person is registered in the digital camera, and location information is not added to an image in which that particular person appears whereas location information is added to an image in which that particular person does not appear. In this case, it is possible to prevent the danger of location information for the place where the registered particular person went from being publicized and invading his or her privacy.

In addition, as another variation, conversely to the variation described above, matters may be arranged so that face information of a particular person is registered in the digital camera, and location information is added to images in which that particular person appears whereas location information is not added to images in which that particular person does not appear.

Further, a variation is also possible in which location information is added for images in which only registered persons appear, i.e., the location information is publicized if an image includes the registered persons only.

The above-described configurations are useful in a case in which, for example, for persons from whom consent has been obtained to publicize images and location information over the Internet, images to which location information is added are publicized, whereas for images showing persons from whom consent has not been obtained to publicize location information, there is no publication of location information.

Fifth Embodiment

A fifth embodiment of the present invention is an example of setting the inhibited area for each particular person.

Figure 12:
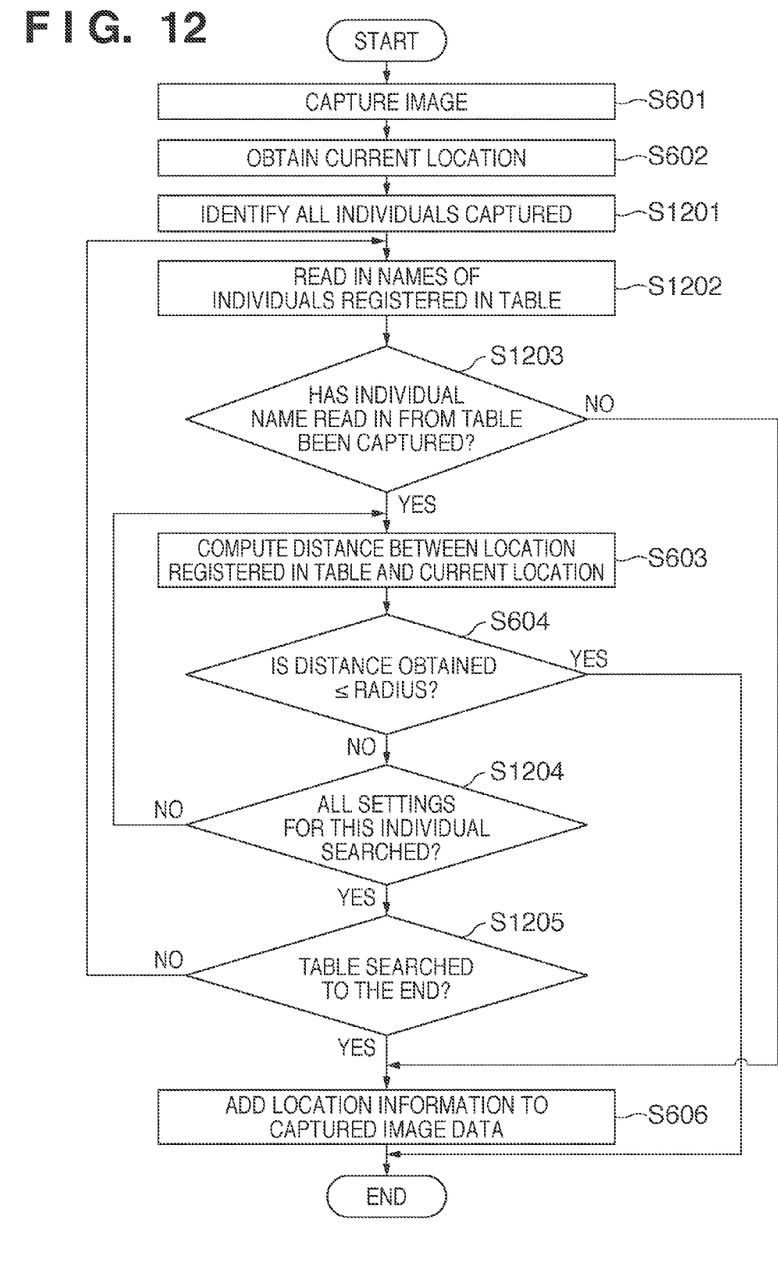
FIG. 12 is a flowchart illustrating an image capturing operation in the image capturing apparatus according to a fifth embodiment of the present invention.

A description is given of image processing performed by the image capturing apparatus 100 of the present invention with reference to the flowchart shown in FIG. 12. In FIG. 12, processes that are the same as those shown in FIG. 6 are given the same reference numerals and descriptions thereof are omitted.

Figure 13:
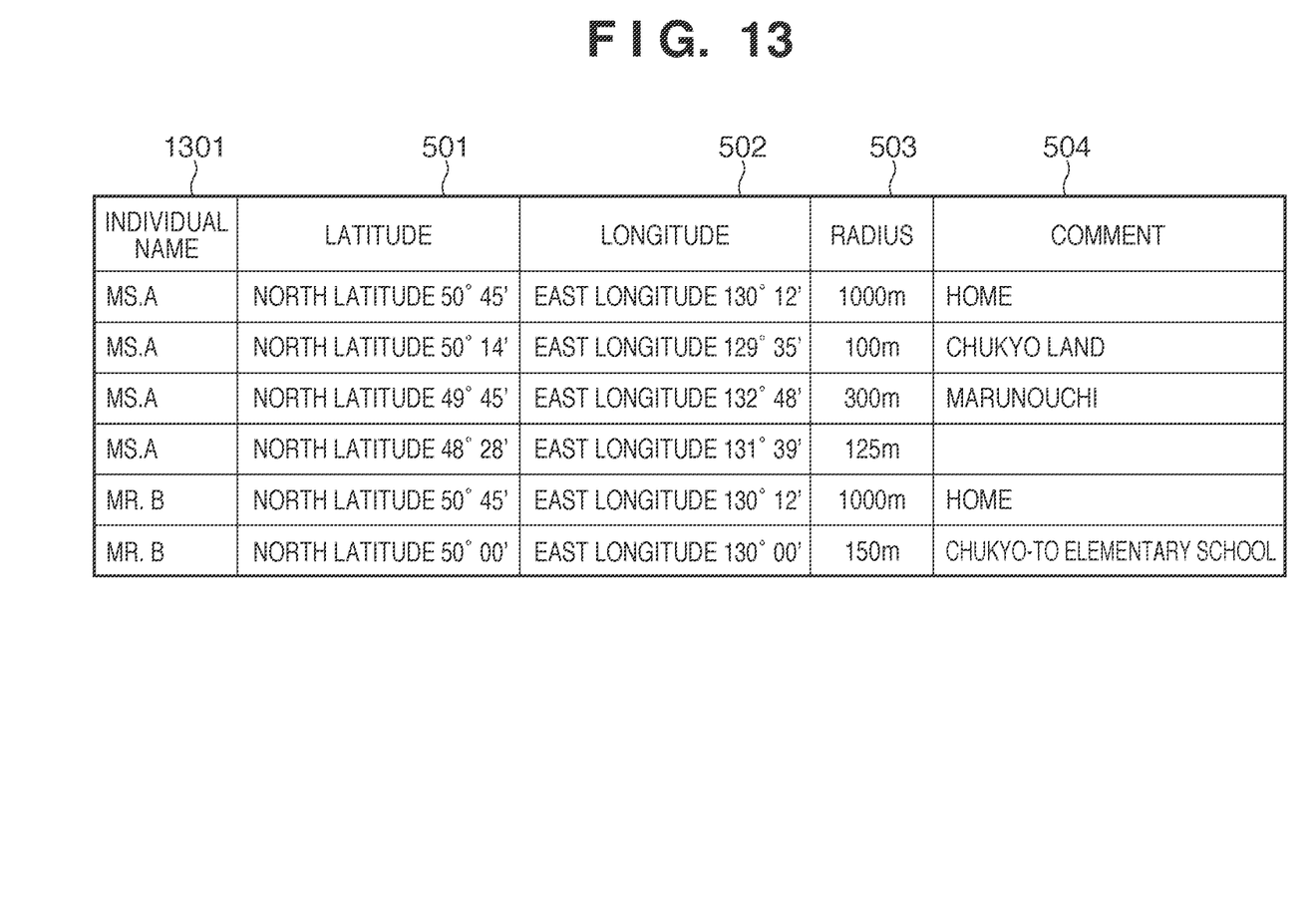
FIG. 13 is a diagram showing an example of a table, stored in the image capturing apparatus according to the fifth embodiment of the present invention, of ranges in which location information is not added to the image.

In the present embodiment, the inhibited area is stored in the secondary storage unit 106 in the form of the table shown in FIG. 13, for example, in which items that are the same as those shown in FIG. 5 are given the same reference numerals and descriptions thereof are omitted. In the table, names indicating persons (individual names 1301), reference location information for the inhibited area (in the present embodiment, the latitude 501 and the longitude 502 of the current location at the time of setting), and comments 504 are associated with each other. In the table shown in FIG. 13, the inhibited area is set for each individual. As for the individual names 1301 and persons' facial features amount, these are stored in the secondary storage unit 106 in a form having associations separate from the table in FIG. 13, such that from the individual name in FIG. 13 that person's facial features amount can be obtained.

After the current location is obtained in step S602, in step S1201 the faces that appear in the captured image are analyzed and individuals identified by checking whether or not there is a face having features close to the facial features amounts stored in the secondary storage unit 106, using techniques that are already known. Then, from the information storing the association between the individual names 1301 and individual facial features amounts, a process of obtaining individual names for extracted individuals is carried out.

In step S1202, an individual name is obtained from the table. Here, an individual name from the table in FIG. 13 is obtained.

In step S1203, it is determined whether or not the person for the individual name read in from the table is included in the persons identified from the captured image. Here, it is sufficient to determine whether or not the individual name read in from the table is present among the individual names obtained in step S1201.

In a case in which it is determined in step S1203 that an individual read in from the table is captured, processing proceeds to step S603. In the event that it is not determined in step S1203 that an individual read in from the table is captured, there is no person who is set in the table and therefore processing proceeds to step S606.

In step S604, in a case in which the distance obtained in step S603 is within the radius set in the table, processing ends without attaching location information to the image. In the event that it is determined in step S604 that the distance obtained in step S603 exceeds the radius set in the table, processing proceeds to step S1204.

In step S1204, it is determined whether or not all settings for this individual have been searched. That is, a process of determining whether or not everything has been searched regarding the inhibited area set for this individual is carried out.

In a case in which it is determined in step S1204 that all settings for this individual have been searched, processing proceeds to step S1205. In the event that it is not determined in step S1204 that all settings for this individual have been searched, processing returns to step S603.

In step S1205, it is determined whether or not the table has been searched to the end. In a case in which it is determined in step S1205 that the table has been searched to the end, processing proceeds to step S606. In the event that it is determined in step S1205 that the table has not been searched to the end, processing returns to step S1202 and is carried out for another individual.

Thus, as described above, an inhibited area in which location information is not attached can be set for each subject. Then, in the case of an image in which multiple people appear, if conditions under which location information is not added are met for even one of these people, location information is not added. As a result, the privacy of captured subjects can be more strongly protected while at the same time also making flexible processing responsive to user requirements possible.

In addition to the effects of the embodiments described above, the present embodiment provides flexible processing responsive to user demands.

Other Embodiments

It is to be noted that any two or more of the first through fourth embodiments described above can be combined and practiced. For example, in a case in which the first and second embodiments are combined, by distinguishing between which data in the table specifies a circular area and which data in the table specifies a rectangular area, even a mixture of both of these still enables accurate determinations to be carried out. Distinguishing between the data may be carried out by any method, including adding a flag showing the type of data and distinguishing on the basis of the flag. Moreover, this distinction may be made by observing that the data specifies a circular area if there is data present in the radius field, whereas the data specifies a rectangular area if the radius field is empty and there is data present in the east-west and north-south direction distance fields.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118044, filed on May 14, 2009, which is hereby incorporated by reference herein in its entirety.

What is claimed is:

1. An image capturing apparatus comprising:
   a first acquisition unit that obtains a current location of the image capturing apparatus;
   a first storage unit that stores information that specifies an inhibited area within which an addition of location information representing the current location of the image capturing apparatus is inhibited;
   a determination unit that determines whether or not the current location of the image capturing apparatus obtained by the first acquisition unit is within the inhibited area stored in the first storage unit; and
   a generating unit that generates captured image data in response to input of a capturing instruction,
   wherein the generating unit generates captured image data to which the location information is not added in a case in which it is determined by the determination unit that the current location of the image capturing apparatus is within the inhibited area, and generates captured image data to which the location information is added in a case in which it is determined by the determination unit that the current location of the image capturing apparatus is not within the inhibited area.

2. The image capturing apparatus according to claim 1, further comprising a second acquisition unit that obtains information that specifies the inhibited area from an external apparatus or a storage medium attached to the image capturing apparatus, and stores the information in the first storage unit.

3. The image capturing apparatus according to claim 1, wherein, even in a case in which it is determined by the determination unit that the current location of the image capturing apparatus is within the inhibited area, the generating unit generates captured image data to which the location information is added in a case in which predetermined conditions are satisfied,
   the predetermined conditions including at least one of a person's face not being detected from the captured image data and that there is predetermined input from the user when the capturing instruction is input.

4. The image capturing apparatus according to claim 1, further comprising a second storage unit that stores information of a particular person's face,
   wherein, in a case in which a captured image according to the capturing instruction contains the face of the particular person stored in the second storage unit, the generating unit generates captured image data to which the location information is not added even in a case in which it is determined by the determination unit that the current location of the image capturing apparatus is not within the inhibited area.

5. The image capturing apparatus according to claim 1, further comprising a second storage unit that stores information of a particular person's face,
   wherein, in a case in which a captured image according to the capturing instruction contains the face of the particular person stored in the second storage unit, the generating unit generates captured image data to which the location information is added even in a case in which it is determined by the determination unit that the current location of the image capturing apparatus is within the inhibited area, and in a case in which a captured image according to the capturing instruction does not contain the face of the particular person stored in the second storage unit, the generating unit generates captured image data to which the location information is not added even in a case in which it is determined by the determination unit that the current location of the image capturing apparatus is not within the inhibited area.

6. The image capturing apparatus according to claim 1, further comprising a second storage unit that stores information of a particular person's face,
wherein, in a case in which a captured image according to the capturing instruction contains only the face of the particular person stored in the second storage unit, the generating unit generates captured image data to which the location information is added even in a case in which it is determined by the determination unit that the current location of the image capturing apparatus is within the inhibited area.

7. The image capturing apparatus according to claim 1, further comprising a third storage unit that stores information specifying an inhibited area that inhibits addition of location information for each individual.

8. An image capturing apparatus comprising:
a first acquisition unit that obtains location information including at least latitude information as a current location of the image capturing apparatus;
a first storage unit that stores information that specifies an inhibited area within which an addition of location information representing the current location of the image capturing apparatus is inhibited;
a determination unit that determines whether or not the current location of the image capturing apparatus obtained by the first acquisition unit is within the inhibited area stored in the first storage unit; and
a generating unit that generates captured image data in response to input of a capturing instruction,
wherein, in a case in which it is determined by the determination unit that the current location of the image capturing apparatus is not within the inhibited area, the generating unit generates captured image data to which the location information is added, and in a case in which it is determined by the determination unit that the current location of the image capturing apparatus is within the inhibited area, the generating unit generates captured image data to which not the location information but a comment is added.

9. The image capturing apparatus according to claim 8, wherein, in a case in which the location information is not added to the captured image data, the comment to be added to the captured image data is information that is associated with the inhibited area stored in the first storage unit.

10. The image capturing apparatus according to claim 8, further comprising a setting unit that allows a user to set a comment as the comment to be added to the captured image data in a case in which the location information is not added to the captured image data.

11. An image capturing apparatus comprising:
a first acquisition unit that obtains a current location of the image capturing apparatus;
a first storage unit that stores information that specifies an inhibited area within which an addition of location information representing the current location of the image capturing apparatus is inhibited;
a determination unit that determines whether or not the current location of the image capturing apparatus obtained by the first acquisition unit is within the inhibited area stored in the first storage unit;
a generating unit that generates captured image data in response to input of a capturing instruction; and
an informing unit that informs a user that location information will not be added to captured image data in a case in which, in a standby state waiting for input of the capturing instruction, it is determined by the determination unit that the current location of the image capturing apparatus is within the inhibited area,
wherein the generating unit generates captured image data to which the location information is not added in a case in which it is determined by the determination unit that the current location of the image capturing apparatus is within the inhibited area, and generates captured image data to which the location information is added in a case in which it is determined by the determination unit that the current location of the image capturing apparatus is not within the inhibited area.

12. A control method for an image capturing apparatus having an acquisition unit that obtains the current location of the image capturing apparatus, the method comprising:
determining whether or not the current location of the image capturing apparatus obtained by the acquisition unit is within an inhibited area stored in a storage unit; and
generating captured image data in response to input of a capturing instruction,
wherein the generating step generates captured image data to which location information representing the current location of the image capturing apparatus is not added in a case in which it is determined in the determining step that the current location of the image capturing apparatus is within the inhibited area, and generates captured image data to which the location information is added in a case in which it is determined in the determining step that the current location of the image capturing apparatus is not within the inhibited area.

13. A control method for an image capturing apparatus having an acquisition unit that obtains location information including at least latitude information as a current location of the image capturing apparatus, the method comprising:
determining whether or not the current location of the image capturing apparatus obtained by the acquisition unit is within an inhibited area stored in a storage unit; and
generating captured image data in response to input of a capturing instruction,
wherein, in a case in which it is determined in the determining step that the current location of the image capturing apparatus is not within the inhibited area, the generating step generates captured image data to which the location information is added, and in a case in which it is determined in the determining step that the current location of the image capturing apparatus is within the inhibited area, the generating step generates captured image data to which not the location information but a comment is added.

14. A control method for an image capturing apparatus having an acquisition unit that obtains the current location of the image capturing apparatus, the method comprising:
determining whether or not the current location of the image capturing apparatus obtained by the acquisition unit is within an inhibited area stored in a storage unit;
generating captured image data in response to input of a capturing instruction; and
informing a user that location information will not be added to captured image data in a case in which, in a standby state waiting for input of the capturing instruction, it is determined in the determining step that the current location of the image capturing apparatus is within the inhibited area,
wherein the generating step generates captured image data to which the location information is not added in a case in which it is determined in the determining step that the current location of the image capturing apparatus is within the inhibited area, and generates captured image data to which the location information is added in a case in which it is determined in the determining step that the current location of the image capturing apparatus is not within the inhibited area.

\* \* \* \* \*